(12) United States Patent
Jiang et al.

(10) Patent No.: US 12,453,830 B2
(45) Date of Patent: Oct. 28, 2025

(54) COMBINED SYSTEM OF CONCEALED CLOSED TRACHEOSCOPE AND ARTIFICIAL AIRWAY BREATHING CIRCUIT

(71) Applicant: ZHONGSHAN HOSPITAL, FUDAN UNIVERSITY, Shanghai (CN)

(72) Inventors: Jinjun Jiang, Shanghai (CN); Shujing Chen, Shanghai (CN)

(73) Assignee: ZHONGSHAN HOSPITAL, FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 19/087,634

(22) Filed: Mar. 24, 2025

(65) Prior Publication Data

US 2025/0269132 A1    Aug. 28, 2025

Related U.S. Application Data

(63) Continuation of application No. PCT/CN2024/108073, filed on Jul. 29, 2024.

(30) Foreign Application Priority Data

Feb. 28, 2024  (CN) .......................... 202410220471.7
Feb. 28, 2024  (CN) .......................... 202420377489.3

(51) Int. Cl.
*A61B 1/00*   (2006.01)
*A61B 1/015*  (2006.01)
(Continued)

(52) U.S. Cl.
CPC ..... *A61M 16/0488* (2013.01); *A61B 1/00066* (2013.01); *A61B 1/00154* (2013.01);
(Continued)

(58) Field of Classification Search
CPC .......... A61M 16/0488; A61M 16/0833; A61M 16/0883; A61M 16/024; A61M 16/0463;
(Continued)

(56) References Cited

U.S. PATENT DOCUMENTS 5,569,161 A * 10/1996 Ebling ............... A61B 1/00142
                                                      385/117
5,964,223 A * 10/1999 Baran .................. A61M 11/001
                                                      128/207.14
(Continued)

FOREIGN PATENT DOCUMENTS

CN         102343119 A      2/2012
CN         208877648 U      5/2019
(Continued)

*Primary Examiner* — Timothy J Neal
(74) *Attorney, Agent, or Firm* — Bayramoglu Law Offices LLC

(57) ABSTRACT

A combined system of a concealed closed tracheoscope and an artificial airway breathing circuit includes an artificial airway breathing tubing and a tracheoscope. The artificial airway breathing tubing includes an inhalation circuit and an exhalation circuit that are connected through a connecting tube. The tracheoscope includes a handle portion and an insertion portion connected to the handle portion. The tracheoscope handle portion wraps around a section of the exhalation circuit. The tracheoscope insertion portion is hidden in the extendable breathing circuit, which extends and retracts to make the tracheoscope insertion portion advance or retreat in a closed condition. The tracheoscope handle function assembly cleverly wraps around the surface of the breathing circuit tubing, organically combining the functions of the tracheoscope handle and the breathing circuit. Meanwhile, the tube interface can be cleaned to keep the tracheoscope clean and unobstructed, such that the service life of the tracheoscope can be extended.

18 Claims, 9 Drawing Sheets

(51) Int. Cl.
*A61B 1/06* (2006.01)
*A61B 1/267* (2006.01)
*A61M 16/00* (2006.01)
*A61M 16/04* (2006.01)
*A61M 16/08* (2006.01)
*A61M 25/06* (2006.01)

(52) U.S. Cl.
CPC ............ *A61B 1/015* (2013.01); *A61B 1/0684* (2013.01); *A61B 1/267* (2013.01); *A61M 16/024* (2017.08); *A61M 16/0463* (2013.01); *A61M 16/0833* (2014.02); *A61M 16/0883* (2014.02); *A61M 2025/0681* (2013.01)

(58) Field of Classification Search
CPC ....... A61M 2025/0681; A61B 1/00066; A61B 1/00154; A61B 1/015; A61B 1/0684; A61B 1/267; A61B 1/0052
See application file for complete search history.

(56) References Cited

U.S. PATENT DOCUMENTS

| | | | |
|---|---|---|---|
| 2012/0116163 A1* | 5/2012 | Lutze | A61B 1/00135 |
| | | | 600/118 |
| 2013/0104884 A1 | 5/2013 | Vazales et al. | |
| 2017/0035276 A1* | 2/2017 | Lombardi | A61B 1/00142 |
| 2017/0143199 A1 | 5/2017 | Grimmer | |
| 2018/0103980 A1* | 4/2018 | Motai | A61B 17/3423 |
| 2018/0206706 A1 | 7/2018 | Wang | |
| 2021/0000336 A1 | 1/2021 | Maximos | |

FOREIGN PATENT DOCUMENTS

| | | |
|---|---|---|
| CN | 115738005 A | 3/2023 |
| CN | 117942472 A | 4/2024 |
| WO | 2021035368 A1 | 3/2021 |
| WO | 2023002365 A1 | 1/2023 |

* cited by examiner

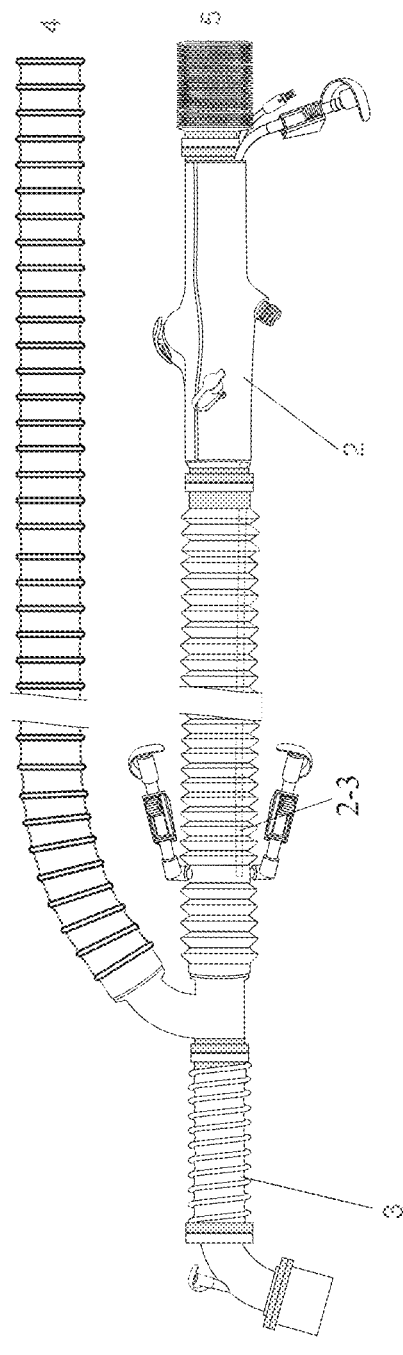
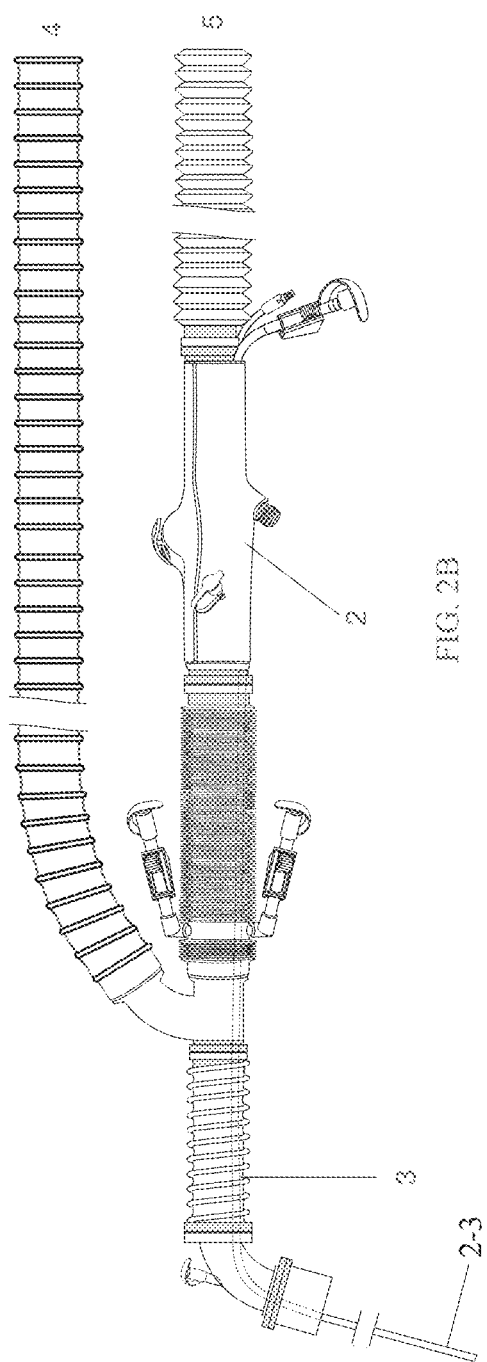
FIG. 2A
FIG. 2B

COMBINED SYSTEM OF CONCEALED CLOSED TRACHEOSCOPE AND ARTIFICIAL AIRWAY BREATHING CIRCUIT

CROSS REFERENCE TO THE RELATED APPLICATIONS

This application is the continuation application of International Application No. PCT/CN2024/108073, filed on Jul. 29, 2024, which is based upon and claims priority to Chinese Patent Applications No. 202410220471.7 and No. 202420377489.3, both filed on Feb. 28, 2024, the entire contents of which are incorporated herein by reference.

TECHNICAL FIELD

The present disclosure relates to a combined system of a concealed closed tracheoscope and an artificial airway breathing circuit, and belongs to the technical field of medical devices.

BACKGROUND

In general, patients who need to establish an artificial airway are divided into two categories, patients with respiratory diseases and patients with non-respiratory diseases. Patients with respiratory diseases may have a large amount of airway secretions, and patients with non-respiratory diseases may also have a large amount of airway secretions due to cough restriction, secretions on the air sac, and regurgitation and aspiration. These patients require suctioning and cleaning to prevent the incidence of ventilator-associated pneumonia. They require 10-20 airway suctions per day and regular tracheoscopic suctions to achieve effective airway clearance, reducing the incidence of ventilator-associated pneumonia and assisting in treatment. Existing airway suctioning utilizes ordinary and closed types of suction tubes to extract sputum by a blind means. The closed suction tube is operated in a closed manner to reduce the possibility of infection, but it suffers from a short lifespan and complexity of components. The two blind suction methods do not allow direct visualization of the airway, and the suction is limited to the trachea and the artificial airway, not to the right and left main bronchi and branches. Therefore, they both have low efficiency and are prone to damaging the airway mucosa, inducing a series of adverse physiologic reactions and even exacerbating the condition in severe cases.

Airway management is very important for patients who use artificial airways, and the most effective method is based on visualized operations. Regular tracheoscopy, bronchoalveolar lavage, sputum suction, and even interventional therapy are the most effective and reliable approaches. Tracheoscopes are divided into two types: reusable and disposable. Reusable tracheoscopes have strong performance, do not consume the materials, can be repeatedly disinfected, and have a low one-time cost. However, they have the risk of disinfection contamination and expensive host prices, leading to a decreasing trend in their use in the intensive care unit (ICU). The use of disposable tracheoscopes is increasing day by day, and they overcome the contamination risk and expensive host prices of reusable tracheoscopes. However, due to the high one-time cost, the disposable tracheoscopes is greatly limited from the widespread use. For some patients, they may need to use tracheoscopes multiple times within 24 hours when there is a significant amount of airway secretions. In this case, the daily usage cost significantly increases, which also limits the use of tracheoscopes, thereby affecting airway management and increasing the incidence of ventilator-associated pneumonia. Therefore, the main contradiction in current airway management in the ICU is that the cost and convenience of disposable tracheoscopes constrain their dynamic monitoring and on-demand use. In this context, many hospitals in China and other countries repeatedly disinfect disposable tracheoscopes for use, which violates medical conventions and poses a significant risk of infection.

Therefore, the current one-time cost and convenience of tracheoscopes are key factors that constrain the rational, dynamic, and on-demand use of disposable tracheoscopes, and are the core factors of visualized airway management. To address the current related issues that are troubling clinical doctors, it is necessary to develop a product with a solution.

SUMMARY

A technical problem to be solved by the present disclosure is to transform artificial airway management from the inefficient mode of blind suction to a sustainable, convenient, visualized, and low-cost efficient mode, thereby comprehensively popularizing and improving the level of airway management, and improving the prognosis of critically ill patients. To this end, an objective of the present disclosure is to provide a combined system of a concealed closed tracheoscope and an artificial airway breathing circuit.

In order to solve the above-mentioned technical problem and achieve the objective, the present disclosure provides a combined system of a concealed closed tracheoscope and an artificial airway breathing circuit, including an artificial airway breathing tubing and a tracheoscope, where the artificial airway breathing tubing includes an inhalation circuit and an exhalation circuit that are connected through a connecting tube;

the exhalation circuit includes: a front-end extendable corrugated tube, a standard breathing circuit tube provided with a tracheoscope handle portion, and a tail-end extendable corrugated tube, which are sequentially connected in series; the front-end extendable corrugated tube is connected to the connecting tube; and the front-end extendable corrugated tube is provided with an upward water injection channel and a downward drainage channel;

the tracheoscope includes the handle portion and an insertion portion connected to the handle portion; one end of the insertion portion is connected to the handle portion, and the other end of the insertion portion serves as a bent portion; and a head end of the bent portion is provided with a camera lens, a light-emitting diode (LED) light source, and a working channel;

the insertion portion is inserted into the front-end extendable corrugated tube and runs through the connecting tube; and the insertion portion is configured to advance through retraction of the front-end extendable corrugated tube such that the bent portion extends from the connecting tube; and the handle portion includes a shell, a tracheoscope bent portion direction control component, and a handle portion function assembly; the shell has a diameter larger than a diameter of the standard breathing circuit tube and wraps around the standard breathing circuit tube; the tracheoscope bent portion direction control component is located inside the shell; and the tracheoscope bent portion direction control handle is connected to the shell through a handle cover, and an operating end of the tracheoscope bent portion direction control handle is exposed.

Preferably, the front-end extendable corrugated tube and the connecting tube are detachably connected, the front-end extendable corrugated tube and the standard breathing circuit tube are detachably connected, and the standard breathing circuit tube and the tail-end extendable corrugated tube are detachably connected.

More preferably, the detachable connection is achieved through a rotatable coupling joint.

Preferably, the water injection channel and the drainage channel each are provided with a regulating valve and a sealing cap for sealing a channel opening.

Preferably, the shell includes an upper handle shell and a lower handle shell that are allowed to be opened and closed; and the tracheoscope bent portion direction control handle is connected to the upper handle shell through the handle cover, and the operating end of the tracheoscope bent portion direction control handle is exposed.

Preferably, a head-end tube separation and connection element is provided between the front-end extendable corrugated tube and the standard breathing circuit tube; the head-end tube separation and connection element is provided with a limiting hole; and the insertion portion is inserted into the limiting hole.

Preferably, an electronic control module is further provided outside the standard breathing circuit tube and inside the shell of the handle portion; and the electronic control module includes a power/video signal line and a power conversion/video processing chip that are electrically connected;

the handle portion is further provided with a negative-pressure suction tubing, a negative-pressure control button connected to the negative-pressure suction tubing and electrically connected to the electronic control module, and a power/video signal connector integrated with an electric connection wire (for connecting an external host); and one end of the negative-pressure suction tubing is connected to the insertion portion, and the other end of the negative-pressure suction tubing is provided with a negative-pressure suction joint; the negative-pressure suction tubing runs through an interior of the handle portion; and the negative-pressure suction joint is exposed from the shell of the handle portion.

Preferably, the working channel is provided at a connection position between the insertion portion and the negative-pressure suction tubing; and the working channel is connected to the insertion portion and the negative-pressure suction tubing separately through the connecting tube.

Preferably, a tail-end tube separation and connection element is provided between the standard breathing circuit tube and the tail-end extendable corrugated tube; the tail-end tube separation and connection element is provided with limiting holes for respectively inserting the negative-pressure suction tubing and the power/video signal connector; and the negative-pressure suction tubing and the power/video signal connector are respectively inserted into the limiting holes of the tail-end tube separation and connection element, and a joint of the negative-pressure suction tubing and a joint of the power/video signal connector are exposed.

Preferably, the negative-pressure control button is connected to a lower handle shell through a button cover, and an operating end of the negative-pressure control button is exposed; the working channel is connected to the lower handle shell through a tube sleeve; and the tube sleeve is provided with a tube cap for sealing an opening of the working channel.

Preferably, the standard breathing circuit tube is a non-extendable tube;

and/or the front-end extendable corrugated tube includes at least one extendable corrugated tube.

Preferably, the front-end extendable corrugated tube includes two extendable corrugated tubes that are fixedly or detachably connected.

More preferably, the front-end extendable corrugated tube includes two extendable corrugated tubes that are connected through a rotatable coupling joint.

Compared with the prior art, the present disclosure has the following beneficial effects:

(1) The present disclosure provides a combined system of a concealed closed tracheoscope and an artificial airway breathing circuit, which performs structural modification based on an existing breathing circuit and disposable tracheoscope. The tracheoscope insertion portion is hidden in the extendable breathing circuit, which extends and retracts to make the tracheoscope insertion portion advance or retreat in a closed condition. The tracheoscope handle function assembly cleverly wraps around the surface of the breathing circuit tubing, organically combining the functions of the tracheoscope handle and the breathing circuit. Meanwhile, the tube interface can be cleaned to keep the tracheoscope clean and unobstructed. In this way, the service life of the tracheoscope can be extended from a single use to about 1 to 2 weeks.

(2) The present disclosure organically integrates the breathing circuit and the tracheoscope, making the operation of the tracheoscope extremely convenient. The operation is achieved in a closed condition, and the artificial airway is subjected to whole-process dynamic visualization management. The system tubing is provided with an external interface, through which the tracheoscope insertion portion can be cleaned. Meanwhile, negative-pressure suction is connected, which can keep the tracheoscope clean and unobstructed, thereby maintaining the normal function of the tracheoscope, prolonging the service life of the tracheoscope, and significantly reducing the one-time cost of the tracheoscope.

(3) The system of the present disclosure can transform artificial airway management from the inefficient mode of blind suction to a continuous, convenient, efficient, visualized, and low-cost mode, comprehensively improving the level of airway management, avoiding cross infection, reducing the occurrence of ventilator-associated pneumonia, and ultimately improving the prognosis of critically ill patients.

BRIEF DESCRIPTION OF THE DRAWINGS

FIG. 2A is a structural schematic diagram of the combined system in a normal idle state according to the present disclosure;

FIG. 2B is a structural schematic diagram of the combined system in a use state according to the present disclosure;

Figure 1:
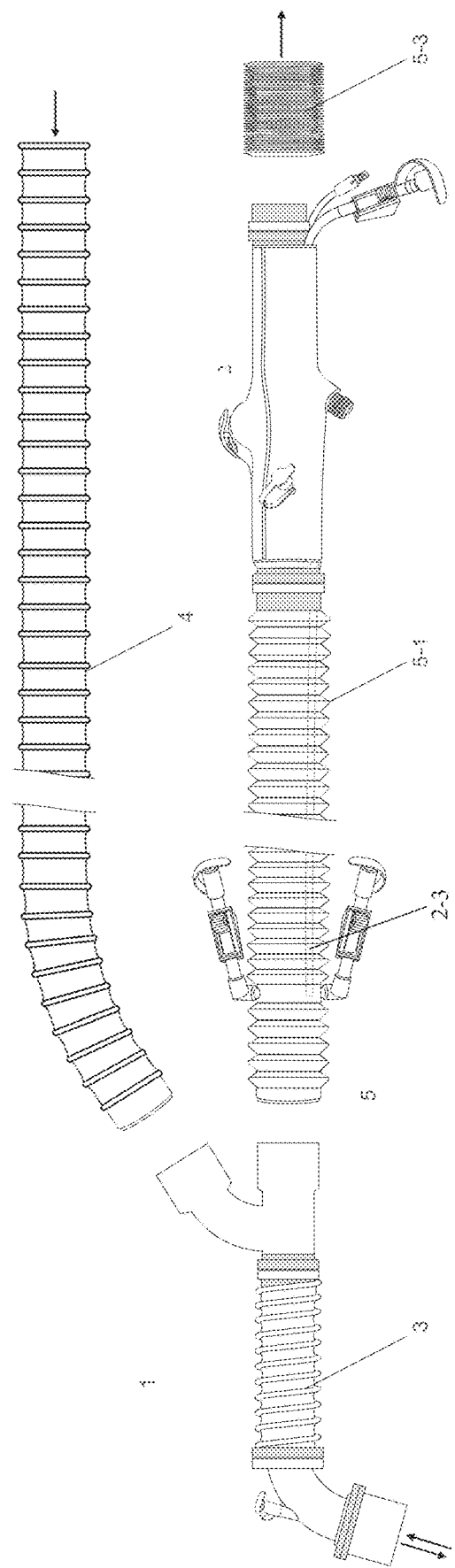
FIG. 1 is an overall structural schematic diagram of a combined system of a concealed closed tracheoscope and an artificial airway breathing circuit according to an embodiment of the present disclosure.

Reference Numerals: 1. artificial airway tubing; 2. tracheoscope; 3. connecting tube; 4. inhalation circuit; 5. exhalation circuit; 2-1. handle portion; 2-2. insertion portion; 2-3. bent portion; 2-4. tracheoscope bent portion direction control handle; 2-5. upper handle shell; 2-6. lower handle shell; 2-7. power/video signal line; 2-8. power conversion/video processing chip; 2-9. negative-pressure suction tubing; 2-10. negative-pressure control button; 2-11. working channel; 2-12. power/video signal connector; 2-13. negative-pressure suction joint; 2-14. tracheoscope bent portion direction control rope fixing element; 2-15. tracheoscope bent portion direction control rope; 2-16. tracheoscope bent portion direction control wheel; 2-17. tracheoscope insertion portion fixing element; 2-18. handle cover; 2-19. button cover; 2-20. tube sleeve; 2-21. tube cap; 3-1. threaded tube; 3-2. bent tube; 3-3. straight-in Y-shaped tube; 3-4. artificial airway interface; 3-5. rotatable coupling joint A; 3-6. rotatable coupling joint B; 3-7. rotatable coupling joint C; 3-8. socket; 5-1. front-end extendable corrugated tube; 5-2. standard breathing circuit tube; 5-3. tail-end extendable corrugated tube; 5-4. first rotatable coupling joint; 5-5. second rotatable coupling joint; 5-6. head-end tube separation and connection element; 5-7. water injection channel; 5-8. drainage channel; 5-9. tail-end tube separation and connection element; 5-10. sealing element; A. forward rotatable coupling joint; B. reverse rotatable coupling joint; C. outer sleeve; and D. inner sleeve.

DETAILED DESCRIPTION OF THE EMBODIMENTS

In order to make the present disclosure more understandable, the present disclosure is described in detail below with reference to preferred embodiments and drawings.

Embodiment

This embodiment provides a combined system of a concealed closed tracheoscope and an artificial airway breathing circuit. As shown in FIGS. 1 to 9, the combined system includes artificial airway tubing 1 and tracheoscope 2. The artificial airway tubing 1 includes inhalation circuit 4 and exhalation circuit 5 that are connected through connecting tube 3. The tracheoscope includes handle portion 2-1 and insertion portion 2-2 connected to the handle portion. One end of the insertion portion 2-2 is connected to the handle portion 2-1, and the other end of the insertion portion 2-2 serves as bent portion 2-3. With an adjustable direction, the bent portion specifically can be a bent serpentine section, which is inserted into a human trachea for tracheal detection and visualized sputum suction. A head end of the bent portion 2-3 is provided with a camera lens, a light-emitting diode (LED) light source, and a working channel (the present disclosure does not modify the structure and composition of the bent portion, which can refer to the structure and composition of the bent portion of an existing tracheoscope). The exhalation circuit 5 includes: front-end extendable corrugated tube 5-1, standard breathing circuit tube 5-2 (which is a non-extendable tubing designed according to an existing standard breathing circuit) provided with a tracheoscope handle and located in a middle section, and tail-end extendable corrugated tube 5-3, which are sequentially connected in series. The front-end extendable corrugated tube 5-1 is connected to the connecting tube 3 in a detachable manner. The handle portion 2-1 of the tracheoscope includes a shell, a tracheoscope bent portion direction control component (including tracheoscope bent portion direction control rope fixing element 2-14, tracheoscope bent portion direction control rope 2-15, and tracheoscope bent portion direction control wheel 2-16), tracheoscope bent portion direction control handle 2-4, and a handle portion function assembly. The shell is sleeved outside the standard breathing circuit tube 5-2 (i.e. the shell has a diameter larger than that of the standard breathing circuit tube and wraps around the standard breathing circuit tube 5-2). The tracheoscope bent portion direction control component is located inside the shell. The tracheoscope bent portion direction control handle 2-4 is connected to the shell through handle cover 2-18. That is, the tracheoscope bent portion direction control handle 2-4 is inserted through the handle cover 2-18 on the shell, and an operating end of the tracheoscope bent portion direction control handle 2-4 is exposed, making it easy to adjust the direction of the bent portion 2-3 of the tracheoscope through a sliding operation (angle adjustment of the bent portion). The shell may specifically include upper handle shell 2-5 and lower handle shell 2-6 that can be opened and closed. The tracheoscope bent portion direction control handle 2-4 is threaded through the upper handle shell 2-5 for easy operation. The tracheoscope insertion portion 2-2 is inserted into the front-end extendable corrugated tube 5-1 and extends into the connecting tube 3. Through the extension and retraction of the front-end extendable corrugated tube 5-1, the tracheoscope insertion portion advances towards the trachea and is inserted into the trachea for operation. The handle portion function assembly include an electronic control module, power/video signal line 2-7, power conversion/video processing chip 2-8, negative-pressure suction tubing 2-9, negative-pressure control button 2-10, working channel 2-11, and other inherent functional components of the tracheoscope handle portion.

Figure 3:
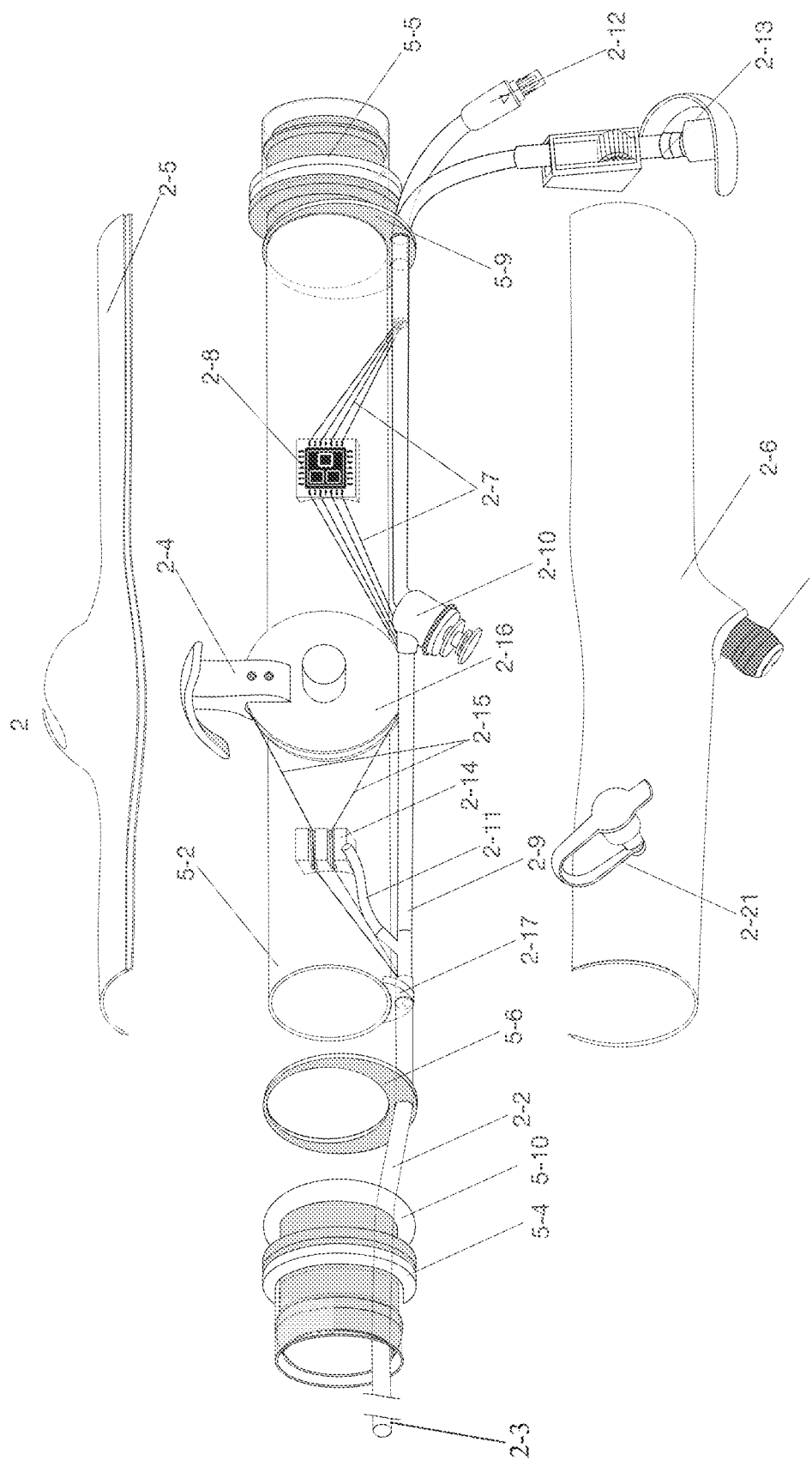
FIG. 3 is a structural schematic diagram of a tracheoscope and a joint connection structure.
Figure 4:
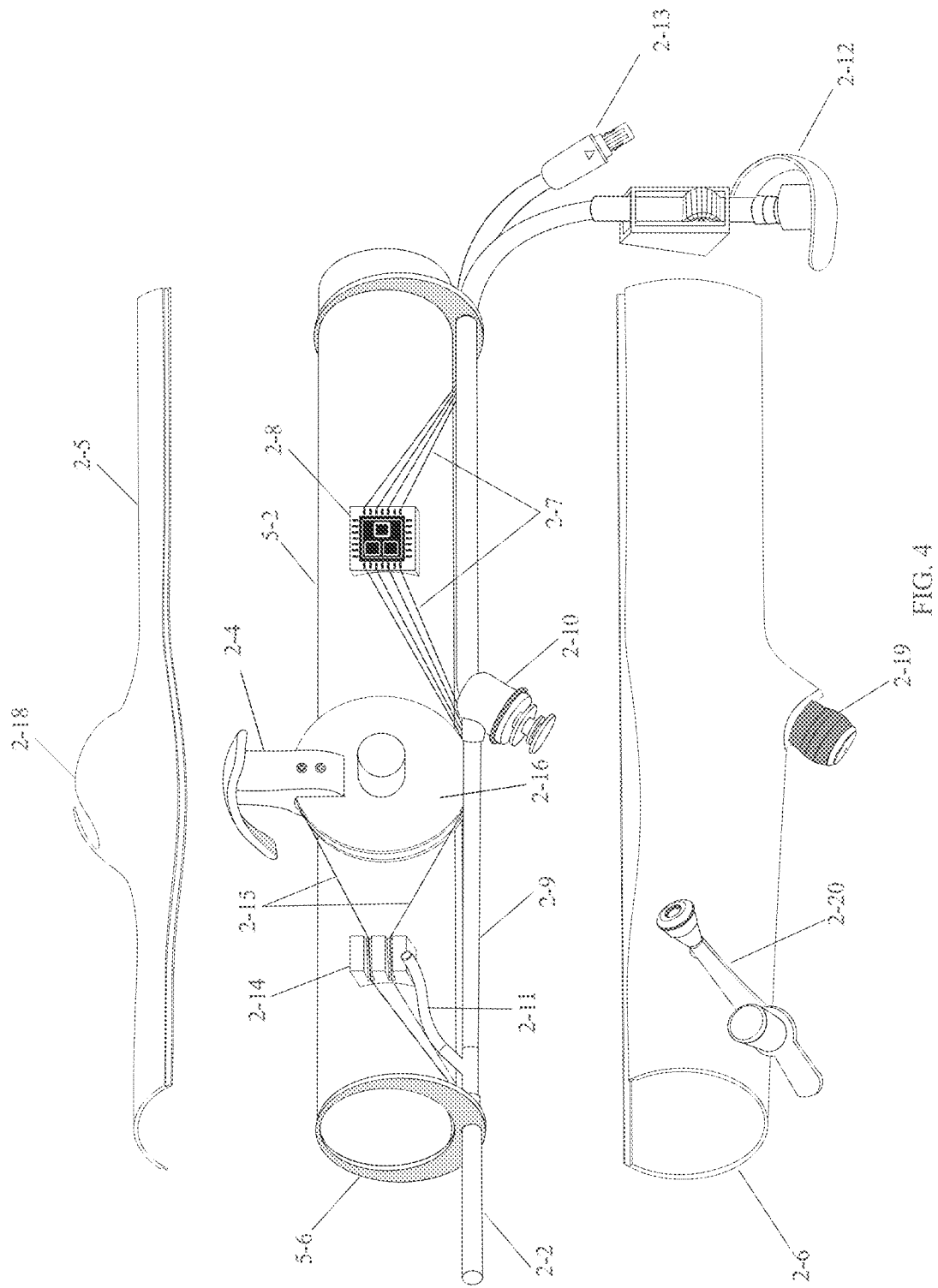
FIG. 4 is a structural schematic diagram of the tracheoscope.

In this embodiment, the front-end extendable corrugated tube 5-1, the standard breathing circuit tube 5-2, and the tail-end extendable corrugated tube 5-3 are detachably connected. Specifically, in this embodiment, the front-end extendable corrugated tube 5-1 and the standard breathing circuit tube 5-2 are connected through first rotatable coupling joint 5-4. The standard breathing circuit tube 5-2 and the tail-end extendable corrugated tube 5-3 are connected through second rotatable coupling joint 5-5. Through the rotatable coupling joint, the direction of the handle portion is adjustable by rotation, thereby adjusting the direction of the tracheoscope bent portion 2-3. The rotatable coupling joint is matched with the bent direction control handle 2-4 to achieve angle adjustment through the bent direction control handle 2-4, and to achieve circumferential adjustment through the rotation of the handle portion. Thus, the bent portion can be adjusted in different directions and angles, facilitating the sputum suction operation of the head end of the bent portion. This design is shown in FIGS. 3 and 4.

In this embodiment, the standard breathing circuit tube is further provided with tracheoscope insertion portion fixing element 2-17, which facilitates the fixation of the tracheoscope insertion portion 2-2. The tracheoscope insertion portion fixing element 2-17 can be a fixing ring, and the tracheoscope insertion portion 2-2 is inserted into the fixing ring to limit the tracheoscope insertion portion. This design is shown in FIG. 3.

Furthermore, head-end tube separation and connection element 5-6 is provided between the front-end extendable corrugated tube 5-1 and the standard breathing circuit tube 5-2. The head-end tube separation and connection element 5-6 is provided with a limiting hole. The insertion portion 2-2 is inserted into the limiting hole to further limit the tracheoscope insertion portion. This design is shown in FIG. 3.

In this embodiment, the front-end extendable corrugated tube 5-1 is provided with upward water injection channel 5-7 and downward drainage channel 5-8. The water injection channel and the drainage channel each are provided with a regulating valve, and channel openings of the water injection channel and the outlet of the drainage channel each are provided with a sealing cap. The water injection channel 5-7 is configured to inject water and clean an outside of the tracheoscope insertion portion by injecting water. The drainage channel 5-8 is configured to perform drainage and can be connected to negative-pressure suction, thereby extracting a small amount of sputum adhering to a head end of the insertion portion. This design is shown in FIGS. 1 and 2A-2B.

Furthermore, in order to ensure the airtightness of the breathing circuit, a joint between each two adjacent tubes is provided with a sealing element (which can be a sealing ring). For example, sealing element 5-10 is provided at a joint between the front-end extendable corrugated tube 5-1 and the standard breathing circuit tube 5-2, as shown in FIG. 3.

In this embodiment, an electronic control module is further provided outside the standard breathing circuit tube 5-2 and inside the shell of the handle portion 2-1. The electronic control module includes power/video signal line 2-7 and power conversion/video processing chip 2-8 that are electrically connected. The handle function assembly further includes negative-pressure suction tubing 2-9, negative-pressure control button 2-10 connected to the negative-pressure suction tubing 2-9 and electrically connected to the electronic control module, and working channel 2-11 located on the negative-pressure suction tubing 2-9 and forming a branch of the negative-pressure suction tubing 2-9. Electrical connection wires of the power/video signal line 2-7 and other components (including the negative-pressure control button and the tracheoscope bent portion direction control handle) are integrated into the power/video signal connector 2-12 after being gathered. The tail-end tube separation and connection element 5-9 is provided (at a connection position) between the standard breathing circuit tube 5-2 and the tail-end extendable corrugated tube 3. The negative-pressure control button 2-10 is fitted onto the lower handle shell 2-6. One end of the negative-pressure suction tubing 2-9 is connected to the insertion portion 2-2, and the other end of the negative-pressure suction tubing 2-9 is provided with negative-pressure suction joint 2-13. The negative-pressure suction tubing 2-9 runs horizontally through an interior of the handle portion, passes through the tail-end tube separation and connection element 5-9, and extends from the tail-end tube separation and connection element 5-9, thereby exposing the negative-pressure suction joint 2-13 to facilitate the connection of an external negative-pressure suction device. Similarly, the power/video signal connector 2-12 is exposed after passing through the tail-end tube separation and connection element 5-9, making it easy to connect an external host. This design is shown in FIGS. 3 and 4.

Furthermore, the negative-pressure control button 2-10 is connected to the lower handle shell 2-6 through button cover 2-19, and an operating end of the negative-pressure control button 2-10 is exposed from the lower handle shell. Similarly, the working channel 2-11 is connected to the lower handle shell 2-6 through tube sleeve 2-20. The tube sleeve 2-20 is further connected to tube cap 2-21 for sealing the working channel 2-11. This design is shown in FIGS. 3 and 4.

Figure 5:
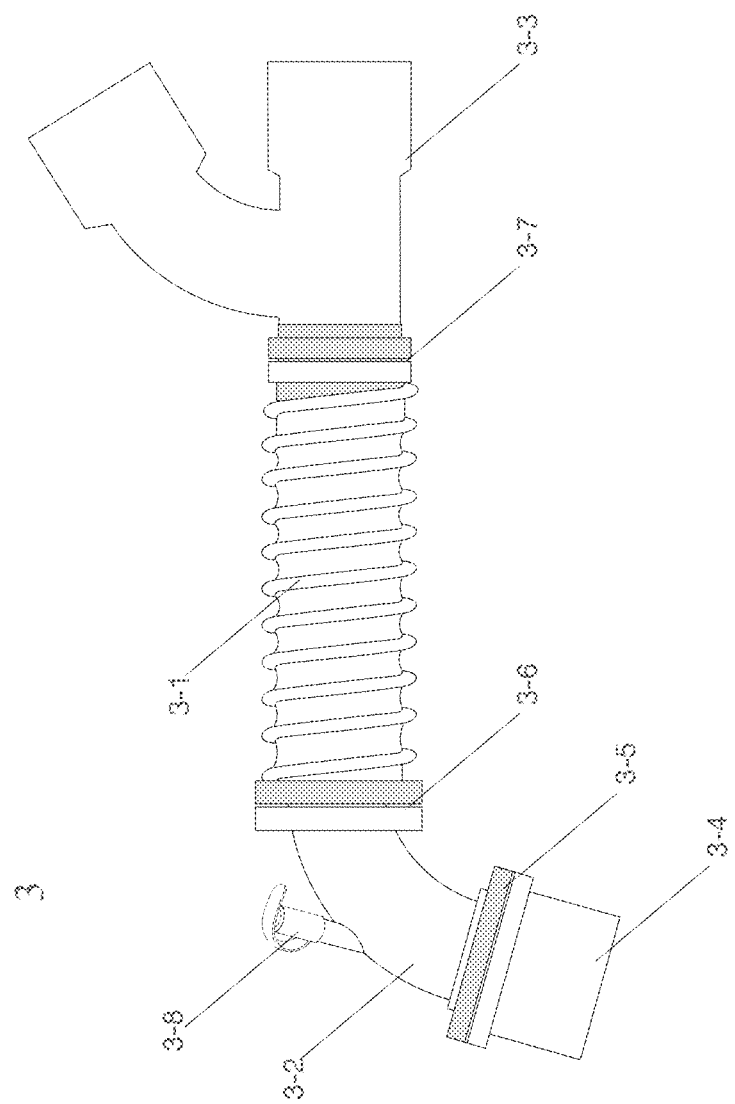
FIG. 5 is a structural schematic diagram of a connecting tube.

Furthermore, as shown in FIG. 5, the connecting tube specifically includes: threaded tube 3-1, bent tube 3-2, straight-in Y-shaped tube 3-3, artificial airway interface 3-4, rotatable coupling joint A 3-5, rotatable coupling joint B 3-6, rotatable coupling joint C 3-7, and socket 3-8.

Figure 6:
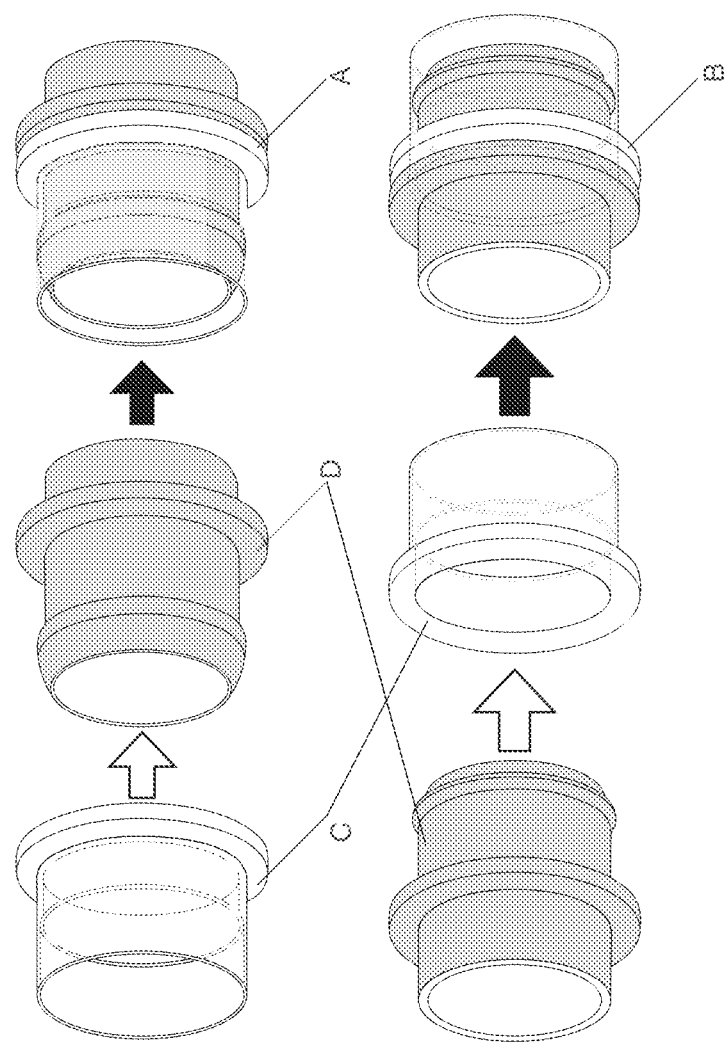
FIG. 6 is a structural schematic diagram of a rotatable coupling joint.
Figure 7:
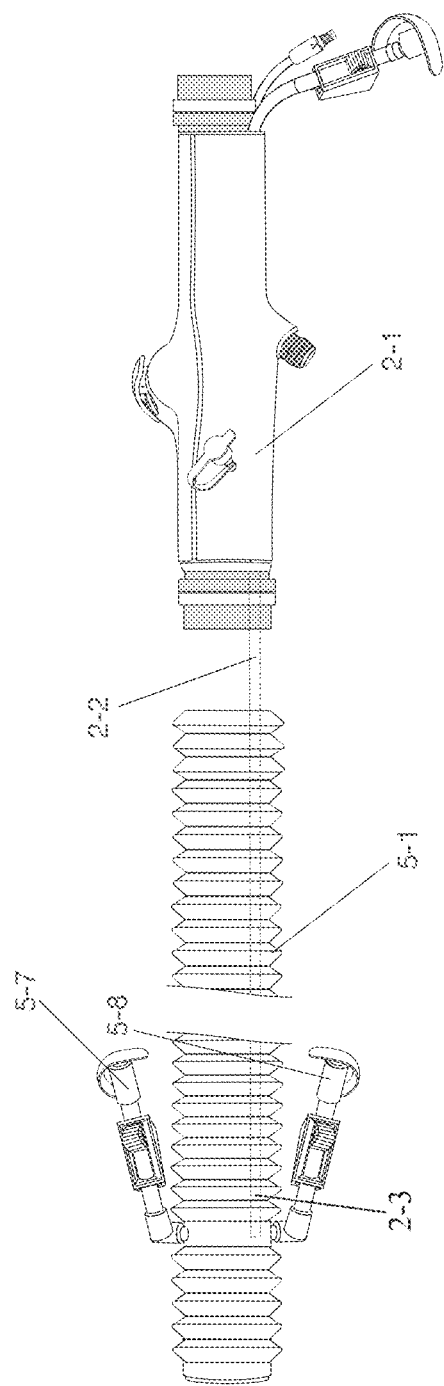
FIG. 7 is a structural schematic diagram of a handle portion and an exhalation circuit that are connected.
Figure 8:
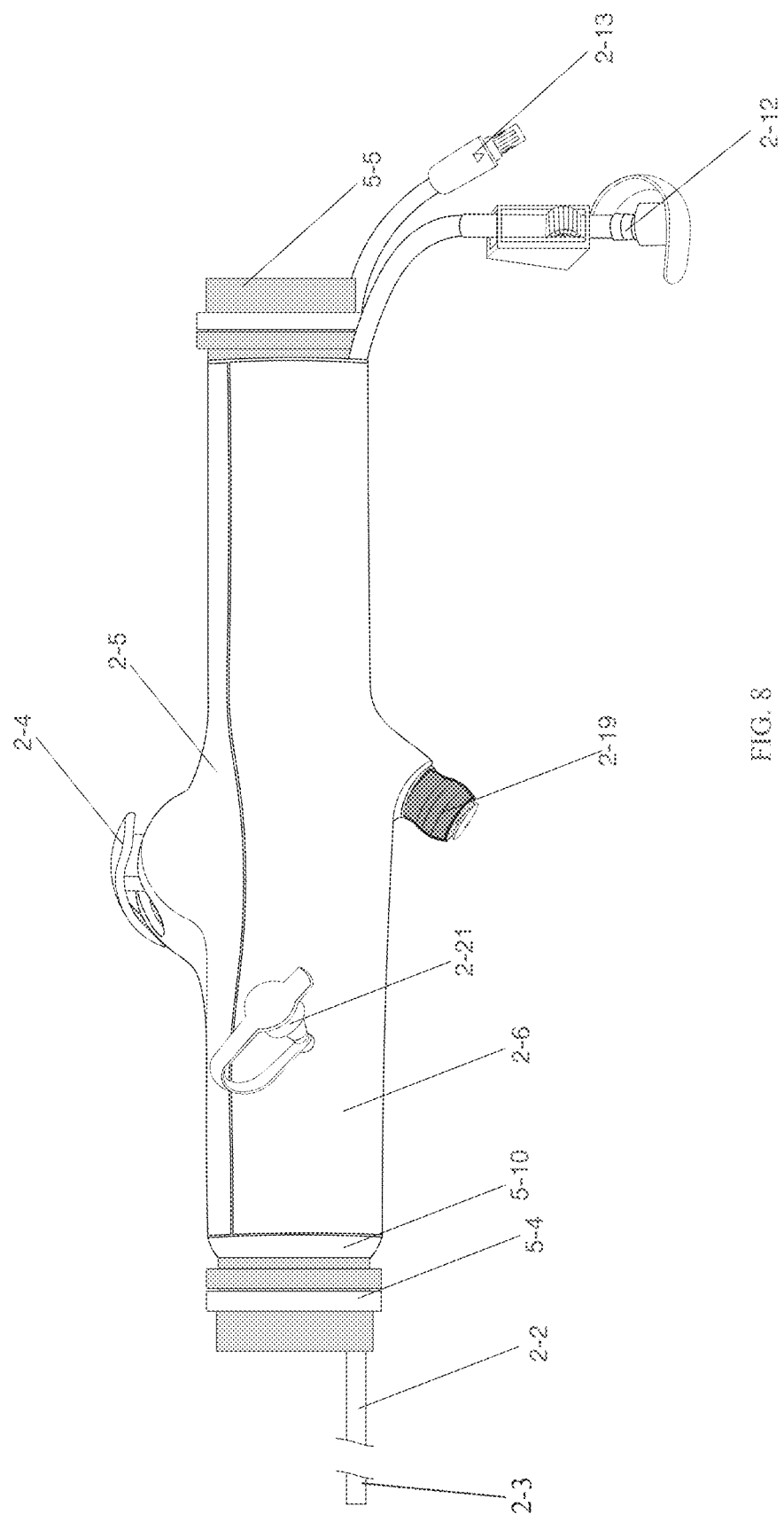
FIG. 8 is a structural schematic diagram of the handle portion.
Figure 9:
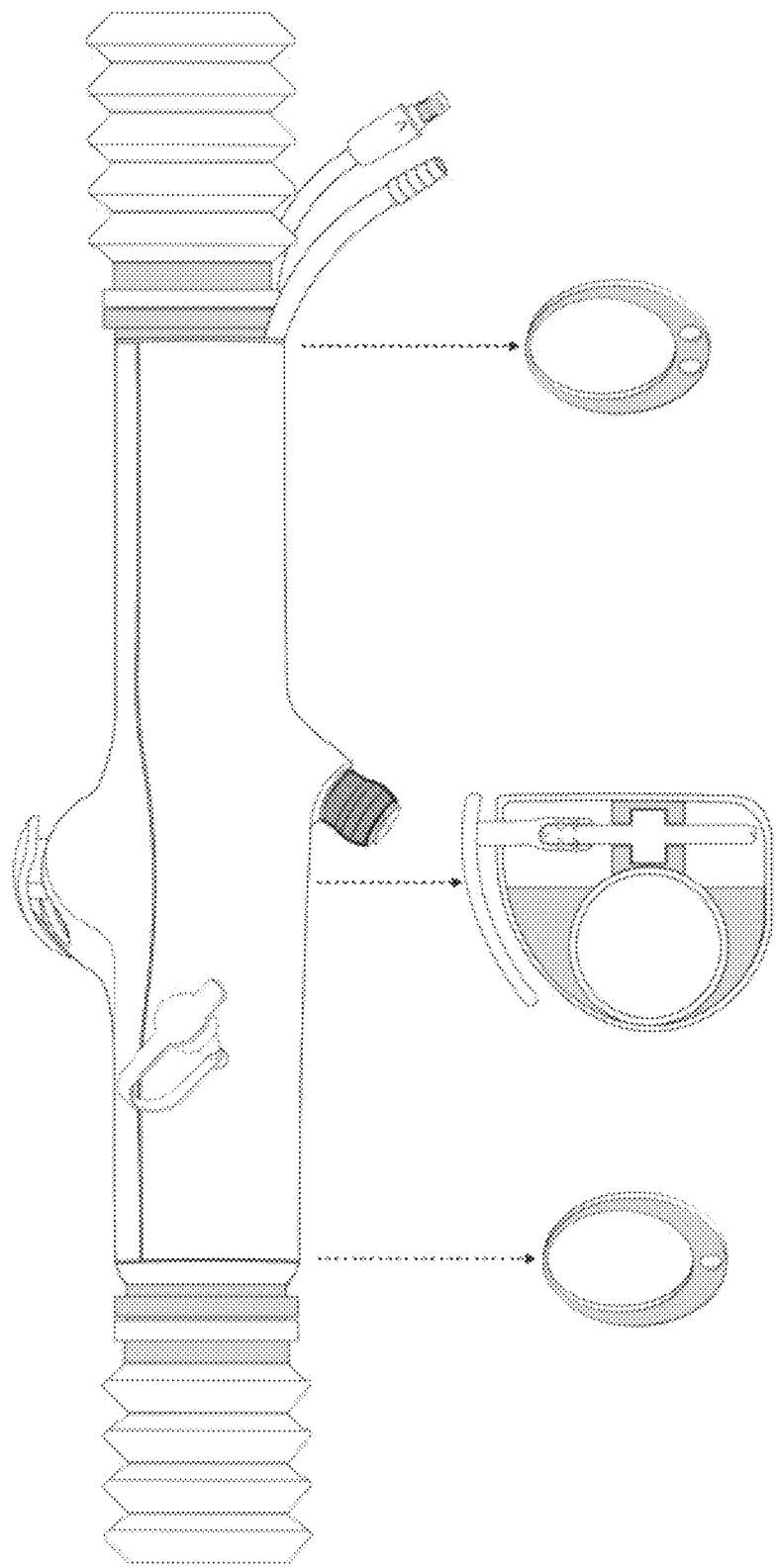
FIG. 9 is a partial schematic diagram of the handle portion.

In this embodiment, the composition of the rotatable coupling joint is shown in FIG. 6. In order to ensure consistency in the direction of rotation, rotatable coupling joints respectively connected to two ends of a same tube are oriented in opposite directions, forming a pair of forward rotatable coupling joint and reverse rotatable coupling joint.

A working principle and process are as follows.

By adjusting the length of the extendable breathing circuit catheter (the front-end extendable corrugated tube 5-1), the tracheoscope insertion portion hidden in the circuit is advanced or retreated. The tracheoscope is operated through the tracheoscope handle integrated into the breathing circuit. Four rotatable coupling joints are designed to adjust the rotation of the handle and the breathing circuit, making it convenient and fast to complete tracheoscopy for one time. By injecting water by the water injection channel for cleaning and by negative-pressure suction, the tracheoscope is kept clean and unobstructed, maintaining its normal function.

The above described are merely preferred embodiments of the present disclosure, which are not intended to limit the present disclosure in any form and substance. It should be noted that those of ordinary skill in the art may make various improvements and supplementations without departing from the principles of the present disclosure, and these improvements and supplementations should be regarded as falling within the protection scope of the present disclosure.

What is claimed is:

1. A combined system of a concealed closed tracheoscope and an artificial airway breathing circuit, comprising an artificial airway breathing tubing and a tracheoscope, wherein the artificial airway breathing tubing comprises an inhalation circuit and an exhalation circuit, wherein the inhalation circuit and the exhalation circuit are connected through a connecting tube;

the exhalation circuit comprises: a front-end extendable corrugated tube, a breathing circuit tube provided with a tracheoscope handle portion, and a tail-end extendable corrugated tube, wherein the front-end extendable corrugated tube, the breathing circuit tube and the tail-end extendable corrugated tube are sequentially connected in series; the front-end extendable corrugated tube is connected to the connecting tube; and the front-end extendable corrugated tube is provided with an upward water injection channel and a downward drainage channel;

the tracheoscope comprises the handle portion and an insertion portion connected to the handle portion; a first end of the insertion portion is connected to the handle portion, and a second end of the insertion portion serves as a bent portion; and a head end of the bent portion is provided with a camera lens, a light-emitting diode (LED) light source, and a working channel;

the insertion portion is inserted into the front-end extendable corrugated tube and runs through the connecting tube; and the insertion portion is configured to advance through retraction of the front-end extendable corrugated tube such that the bent portion extends from the connecting tube; and the handle portion comprises a shell, a tracheoscope bent portion direction control component, and a tracheoscope bent portion direction control handle; the shell has a diameter larger than a diameter of the breathing circuit tube and wraps around the breathing circuit tube; the tracheoscope bent portion direction control component is located inside the shell; and the tracheoscope bent portion direction control handle is connected to the shell through a handle cover, and an operating end of the tracheoscope bent portion direction control handle is exposed.

2. The combined system according to claim 1, wherein the front-end extendable corrugated tube and the connecting tube are detachably connected, the front-end extendable corrugated tube and the breathing circuit tube are detachably connected, and the breathing circuit tube and the tail-end extendable corrugated tube are detachably connected.

3. The combined system according to claim 2, wherein the detachable connection is achieved through a rotatable coupling joint.

4. The combined system according to claim 3, wherein the breathing circuit tube is a non-extendable tube;
and/or the front-end extendable corrugated tube comprises two extendable corrugated tubes connected to each other.

5. The combined system according to claim 2, wherein the breathing circuit tube is a non-extendable tube;
and/or the front-end extendable corrugated tube comprises two extendable corrugated tubes connected to each other.

6. The combined system according to claim 1, wherein the shell comprises an upper handle shell and a lower handle shell, wherein the upper handle shell and the lower handle shell are allowed to be opened and closed; and the tracheoscope bent portion direction control handle is connected to the upper handle shell through the handle cover, and the operating end of the tracheoscope bent portion direction control handle is exposed.

7. The combined system according to claim 6, wherein the breathing circuit tube is a non-extendable tube;
and/or the front-end extendable corrugated tube comprises two extendable corrugated tubes connected to each other.

8. The combined system according to claim 1, wherein a head-end tube separation and connection element is provided between the front-end extendable corrugated tube and the breathing circuit tube; the head-end tube separation and connection element is provided with a limiting hole; and the insertion portion is inserted into the limiting hole.

9. The combined system according to claim 8, wherein the breathing circuit tube is a non-extendable tube;
and/or the front-end extendable corrugated tube comprises two extendable corrugated tubes connected to each other.

10. The combined system according to claim 1, wherein an electronic control module is provided outside the breathing circuit tube and inside the shell of the handle portion; and the electronic control module comprises a power/video signal line and a power conversion/video processing chip, wherein the power/video signal line and the power conversion/video processing chip are electrically connected;
the handle portion is further provided with a negative-pressure suction tubing, a negative-pressure control button connected to the negative-pressure suction tubing and electrically connected to the electronic control module, and a power/video signal connector integrated with an electric connection wire; and
a first end of the negative-pressure suction tubing is connected to the insertion portion, and a second end of the negative-pressure suction tubing is provided with a negative-pressure suction joint; the negative-pressure suction tubing runs through an interior of the handle portion; and the negative-pressure suction joint is exposed from the shell of the handle portion.

11. The combined system according to claim 10, wherein the working channel is provided at a connection position between the insertion portion and the negative-pressure suction tubing; and the working channel is connected to the insertion portion and the negative-pressure suction tubing separately through the connecting tube.

12. The combined system according to claim 11, wherein the breathing circuit tube is a non-extendable tube;
and/or the front-end extendable corrugated tube comprises two extendable corrugated tubes connected to each other.

13. The combined system according to claim 10, wherein a tail-end tube separation and connection element is provided between the breathing circuit tube and the tail-end extendable corrugated tube; the tail-end tube separation and connection element is provided with limiting holes for respectively inserting the negative-pressure suction tubing and the power/video signal connector; and the negative-pressure suction tubing and the power/video signal connector are respectively inserted into the limiting holes of the tail-end tube separation and connection element, and a joint of the negative-pressure suction tubing and a joint of the power/video signal connector are exposed.

14. The combined system according to claim 13, wherein the breathing circuit tube is a non-extendable tube;
and/or the front-end extendable corrugated tube comprises two extendable corrugated tubes connected to each other.

15. The combined system according to claim 10, wherein the negative-pressure control button is connected to a lower handle shell through a button cover, and an operating end of the negative-pressure control button is exposed; the working channel is connected to the lower handle shell through a tube sleeve; and the tube sleeve is provided with a tube cap for sealing an opening of the working channel.

16. The combined system according to claim 15, wherein the breathing circuit tube is a non-extendable tube;
and/or the front-end extendable corrugated tube comprises two extendable corrugated tubes connected to each other.

17. The combined system according to claim 10, wherein the breathing circuit tube is a non-extendable tube;
and/or the front-end extendable corrugated tube comprises two extendable corrugated tubes connected to each other.

18. The combined system according to claim 1, wherein the breathing circuit tube is a non-extendable tube;
and/or the front-end extendable corrugated tube comprises two extendable corrugated tubes connected to each other.

* * * * *